United States Patent [19]

Buschini et al.

[11] 3,962,755
[45] June 15, 1976

[54] LINK COMPONENT FOR TRAWLING GEAR

[75] Inventors: Anthony Alan Buschini, Fleetwood; Douglas Edward Swarsbrick, Stourport-on-Severn, both of England

[73] Assignee: Parsons Controls Limited, Stourport on Severn, England

[22] Filed: Aug. 19, 1974

[21] Appl. No.: 498,767

[30] Foreign Application Priority Data
Aug. 24, 1973  United Kingdom............ 40208/70

[52] U.S. Cl..................... 24/201 HL; 24/230.5 R; 294/82 R; 59/86
[51] Int. Cl.² ........................................ A44B 13/00
[58] Field of Search . 24/201 LP, 201 HL, 230.5 SS, 24/230.5 R, 230.5 BA, 201 HE; 403/159; 294/82 R; 59/85, 86

[56] References Cited
UNITED STATES PATENTS

| | | | |
|---|---|---|---|
| 975,323 | 11/1910 | Brown | 24/230.5 CR |
| 1,072,263 | 9/1913 | Shaw | 24/230.5 CR |
| 3,280,438 | 10/1966 | Luketa | 24/201 HL |
| 3,863,441 | 2/1975 | Kaufmann | 294/82 R |

FOREIGN PATENTS OR APPLICATIONS

| | | | |
|---|---|---|---|
| 718,154 | 3/1942 | Germany | 24/230.5 SS |
| 16,908 | 7/1894 | United Kingdom | 24/201 HL |
| 389,373 | 3/1933 | United Kingdom | 24/201 HL |

*Primary Examiner*—Bernard A. Gelak
*Attorney, Agent, or Firm*—Baldwin, Wight & Brown

[57] ABSTRACT

A link component for use in trawling gear which is made of metal and has at one end a closed loop, the other end having two projecting arms which, together with part of the loop, provide a clevis or shackle, the arms of which have apertures to receive a connecting pin for connection to an end link of a chain and wherein the loop is sufficiently wide at its end remote from the shackle to receive a pair of couplers for two wire ropes or chains and wherein at least one of the wide pieces of the closed loop is provided with a recess or flat sufficiently wide to enable a hook of predetermined size to be hooked onto the loop provided the throat of the hook is correctly orientated.

7 Claims, 3 Drawing Figures

LINK COMPONENT FOR TRAWLING GEAR

This invention relates to a component for use with chain and in particular to a component designed specifically for use with chain used in a fishing trawl.

In the past, the deep sea trawling industry has had to rely upon mild steel fittings which are of uncertain strength, and wire rope for its trawls. We have now found that by using heat treated alloy steel instead of mild steel, a much stronger and more reliable trawl results. During the design of the various components, care had to be taken to make the various components as versatile as possible so that they were capable of various uses in different positions in all methods of and variations in deep water trawling.

We have found that by using a heat treated alloy steel, preferably nickel chromium molybdenum alloy steel, and fully heat treating the alloy, the components can be made extremely wear resistant and have a Brinell hardness in the range of 380 – 410. This wear resistance means that the life expectancy of our components and the chain itself should be in the order of 10:1 compared with components made of conventional mild steel. Furthermore, because of the quality of the steel alloy, it has been possible to design components and chain which as well as having high strength, are of light weight and are easy to handle. This has the advantage of reducing crew fatigue and in certain instances of reducing man power.

In the rigging of a trawl it is necessary in several places to have a chain component or link into which is engaged a hook so that the hook can be detached from the link when the trawl is hauled on board the trawler. In another place in a trawl it is necessary to have an attachment between three chain legs forming a Y and we have therefore designed a link which could be used in both positions.

According to the present invention, we provide a recessed link component for use in a fishing trawl, comprising a metallic member having a closed loop, one end of which has a slotted projecting limb providing a U-shaped clevis, the arms of which have apertures to receive a connecting pin for connection to an end link of a chain and the other end of which is sufficiently wide to receive in side by side relation a pair of couplers to provide a coupling in the shape of a Y, and wherein at least one of the side pieces connecting the two ends of the component is provided with a recess or flat to accommodate the throat of a hook of predetermined size, provided the hook and component are suitably relatively orientated.

Preferably, the apertures in the arms of the clevis are oval in shape to receive an oval connecting pin, the connecting pin being provided with at least one tangential groove to receive a locking pin passing through a further aperture in one of the arms of the clevis at right angles to the oval aperture.

Preferably, the component is manufactured from nickel chromium molybdenum alloy steel.

Also according to the present invention, we provide trawling gear which incorporates at least one trawl component as hereinbefore described.

One embodiment of recessed link component for a trawl according to the present invention is now described with reference to the accompanying drawings, in which.

Figure 1:
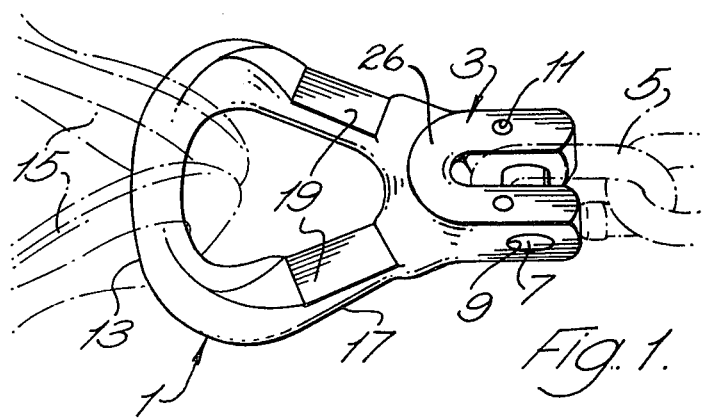
FIG. 1 is a perspective view of the link component.

Referring to the drawings, the link component comprises a metallic closed loop 1, and a projecting slotted limb with arms defining a clevis or shackle 3 to which the end link of a chain 5 can be connected with the aid of an oval connecting pin 7. For this purpose, parallel arms of the clevis 3 are provided with aligned transverse oval apertures 9 in which the connecting pin 7 can be located and each of the arms is also provided with a small aperture 11 extending at right angles to the associated oval aperture 9, the aperture 11 being so located that when a locking pin is inserted in the apertures, it can engage with a tangential groove formed in the surface of the connecting or load pin 7.

The end or crown 13 of the closed loop 1 remote from the clevis 3 is widened with respect to the remainder of the link to receive a pair of couplers or shackle-like members 15, each attached to the end of a length of chain, so that when the link component is in use as depicted in FIG. 1, it will act as a Y connector.

Figure 3:
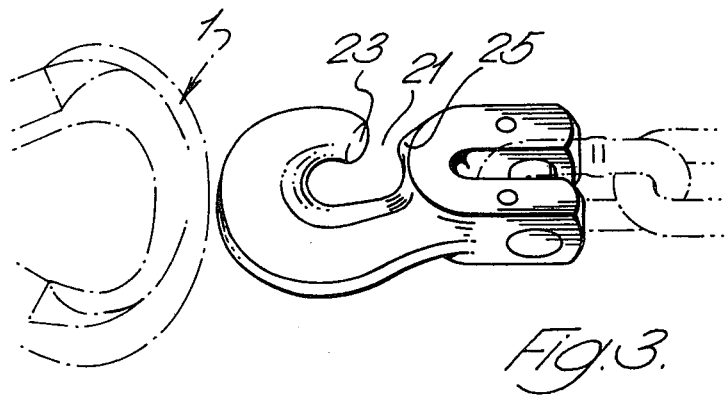
FIG. 3 is a perspective view of a hook for use with the link component.

The loop 1 comprises, in addition to the crown 13, side arms 17 each of which is inclined to the longitudinal central axis of the link at an angle of about 20°. Each of the side arms 17 is provided intermediate its ends with a flat 19 on its upper and lower faces, thereby providing a recessed portion of predetermined reduced thickness. The predetermined thickness allows a special hook 23 such as that shown in FIG. 3 to be connected to the loop 1, provided the hook and link are correctly orientated relative to each other and yet to prevent the hook from being disconnected from the link except when it is precisely correctly orientated. As can be seen from FIG. 3, the hook 23 is in a shape of a G and has a throat 21 between the tip of the hook and a shoulder 25 opposed to the tip, which throat is fractionally wider than the width between the two flats 19 on each of the side pieces of the loop 1. This means that the hook shown in FIG. 3 can be used to lift the link component and trawl equipment connected to it when required.

Figure 2:
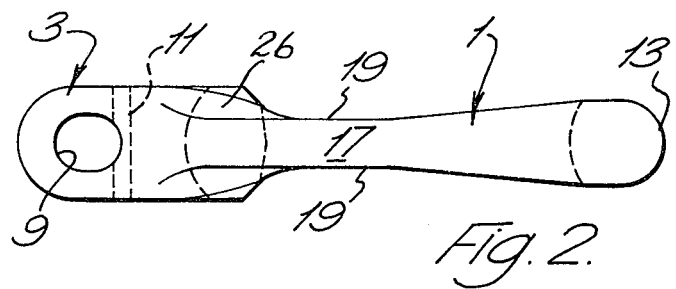
FIG. 2 is a side elevation to a larger scale.

By way of review, and as shown in FIGS. 1 and 2, an intervening portion 26 of the link component separates the end of the component comprising the loop 1 and the other component end comprising the parallel arms of the U-shaped clevis 3 which is closed by the pin 7. The inclined side arms of the pair of arms 17, 17 diverge and extend outwardly from the intermediate portion 26 toward the outer end of the loop 1 which is wider than the clevis 3. The widened outer end of the loop 1 enables the latter to receive the pair of couplers 15, 15 in side-by-side relationship as shown in FIG. 1.

The flats 19 providing the reduced thickness portions are shown in FIGS. 1 and 2 as being respectively on the top and bottom surfaces of the diverging arms 17, 17, being parallel to each other and to the general plane of the link component.

What is claimed is:

1. A unitary link component for use with a fishing trawl and having an intermediate generally transverse portion separating a first end of the component from a second end thereof; a pair of diverging arms extending outwardly from said intermediate portion toward said first end; a crown connecting together the outer ends of said arms at one end of said link component to define, with said diverging arms and said intermediate portion, a closed loop wider at its outer end than its inner end and sufficiently wide to receive in side-by-side relation a pair of couplers to provide a Y-shaped coupling, said arms extending a major portion of said closed loop; a pair of parallel arms extending from said intermediate portion toward said second end of said component; means defining apertures in each of said parallel arms, said apertures being transversely aligned with respect to said parallel arms; and a connecting pin in said apertures and providing with said parallel arms and said intermediate portion a closed U-shaped clevis adapted to receive a link of a chain, the width of said clevis being less than that of said closed loop at said one end of the component, at least one of said diverging arms having a portion of a predetermined reduced thickness to accommodate the throat of a hook of predetermined size when the hook and said component are relatively oriented with said throat positioned to pass over said one of said diverging arms at its portion of reduced thickness, thereby to engage said hook operatively with said closed loop.

2. A component as claimed in claim 1 wherein the apertures in the arms of the clevis are oval in shape to receive an oval connecting pin, a further aperture being provided in at least one of said arms and extending at right angles to the oval aperture and being arranged tangential thereto to receive a locking pin arranged to engage in a tangential groove in the oval connecting pin.

3. A component as claimed in claim 1 wherein the component is manufactured from nickel chromium molybdenum alloy steel.

4. A component as claimed in claim 1 wherein said diverging arms are respectively inclined to the longitudinal axis of the component at an angle of substantially 20°.

5. Trawling gear incorporating at least one trawl component as claimed in claim 1; two side-by-side couplers engaging said closed loop at said crown thereof; and a chain link engaging said connecting pin between said parallel arms of said clevis.

6. A component as claimed in claim 1 wherein each of said diverging arms has a portion of said predetermined reduced thickness.

7. A component as claimed in claim 6 wherein said portions of reduced thickness are provided by flats on the top and bottom surfaces of said diverging arms, said flats being parallel to each other and to the general plane of said component.

* * * * *